United States Patent [19]

Troiani et al.

[11] 3,845,401

[45] Oct. 29, 1974

[54] SENSE AMPLIFIER THRESHOLD TESTER

[75] Inventors: Charles Troiani; Gary L. Tolzman, both of Phoenix, Ariz.

[73] Assignee: Honeywell Information Systems Inc., Waltham, Mass.

[22] Filed: Feb. 5, 1973

[21] Appl. No.: 329,810

[52] U.S. Cl. .......................... 330/2, 328/148, 330/75

[51] Int. Cl. ............................................ G01r 19/00

[58] Field of Search ................. 330/2, 30 D, 69, 75; 328/148; 324/123 R, 123 C

[56] References Cited

UNITED STATES PATENTS 3,581,198 5/1971 Shoemaker ......................... 330/2 X

*Primary Examiner*—James B. Mullins

*Attorney, Agent, or Firm*—Edward A. Gerlaugh; Edward W. Hughes; Walter W. Nielsen

[57] ABSTRACT

The complement digital output of a memory sense amplifier circuit under test is integrated and fed back as the input signal of the circuit. When the input signal exceeds a predetermined reference signal by a small increment which is characteristic of the sense amplifier under test, the binary output of the sense amplifier changes state. The difference between the input signal level and the reference voltage level is detected, amplified, and compared with a predetermined error reference voltage. If the amplified difference voltage exceeds the predetermined error voltage, the device is rejected.

5 Claims, 3 Drawing Figures

SENSE AMPLIFIER THRESHOLD TESTER

BACKGROUND OF THE INVENTION

The invention relates to sense amplifier circuits and more particularly to a method and apparatus for dynamically testing the threshold sensitivity of a sense amplifier circuit.

Advances in microcircuit technology and in the packaging of electronic circuits and components have resulted in a manifold increase in circuit density and a consequent tightening of reliability requirements at the module or printed wiring board level. For example, a digital computer core memory sense amplifier circuit manufactured from transistors and discrete components ordinarily was packaged on a single printed wiring board. In modern computers such a circuit comprising as many as several dozen transistors, resistor and other components, may be packaged in a single, dual-in-line package or flat-pack module. Similarly, many dozens of sense amplifier modules are interconnected on a single printed wiring board which is then inserted into the computer cabinet. Consequently, testing of the printed wiring boards in a system environment after they are manufactured and the discovery of defective sense amplifier modules results in extensive rework of the printed wiring boards in order to replace defective modules, and again test the board. More stringent test specifications at the module or package level are therefore required in order to preclude excessive rework and testing in the system environment at the printed wiring board level.

Prior art test methods and apparatus utilize both static and dynamic techniques for testing integrated circuit modules. Generally, the static tests are accomplished by applying specified DC input voltages to the device, and measuring the outputs to ensure that the device is in the correct logic state or is generating the correct voltage in accordance with the manufacturerXs test specification. Either category of tester, static or dynamic, or a combination of both types, may be implemented as a self-contained unit for testing a module or a group of modules. Alternatively, the tester may comprise standard electronic test equipment such as signal generators, meters, oscilloscopes, etc. In order to test a circuit such as a memory sense amplifier in an environment approximating the end use environment, it is necessary to perform dynamic tests at or near the operational limits of the circuit. Prior art testers which provide such an environment utilize expensive, precision laboratory test equipment which is cumbersome and impractical in a computer manufacturing environment. Practical instrumentation for the computer manufacturing ennvironment measures all specified parameters statically by applying a DC voltage input to the device being tested and measuring the output of the device to assure that the device is in the correct logic state. Dynamic tests performed with non-precision test equipment apply large-signal pulsed inputs, i.e., excessive overdrive at the input of the circuit. Dynamic tests with large-signal inputs do not test the device characteristics at or near the operational limits of the circuit. For example, in a memory sense amplifier, the threshold behavior and propagation time are inadequately evaluated when large signal inputs are utilized for dynamic testing.

Accordingly, it is desirable to provide test apparatus which is relatively inexpensive and relatively small in size when compared with precision laboratory test equipment, and which apparatus provides the capability for dynamically testing a complex integrated circuit near the operational threshold of the circuit, thereby simulating the end use environment in which the circuit ultimately can operate.

It is, therefore, a primary object of the invention to provide a new and improved method and apparatus for dynamically testing integrated circuits.

Another object of the invention is to provide a method and apparatus for testing integrated circuit sense amplifiers operating at or near their designed limit of threshold sensitivity.

SUMMARY OF THE INVENTION

These and other objects are achieved in the present invention by providing a low pass filter having a controlled frequency response for integrating the complement digital output of an integrated circuit sense amplifier. The output of the low-pass filter is attenuated and fed back as the input signal of the sense amplifier. When the sense amplifier detects a change in the input signal sufficient with respect to a reference bias voltage supplied to the sense amplifier, the digital output changes state. The changed digital level is again integrated, attenuated and fed back to the input of the sense amplifier in a repetitive process. The voltage about which the input varies is the threshold voltage characteristic of the device under test. An error amplifier detects and amplifies the difference between the input signal voltage and the applied reference bias voltage. The amplified difference voltage is compared with a predetermined error reference voltage; if the error reference voltage is exceeded the comparator actuates an indicating device and the sense amplifier being tested is rejected.

The invention is pointed out with particularity in the appended claims; however, other objects and features will become more apparent and the invention itself will be best understood by referring to the following description and embodiments taken in conjunction with the accompanying drawings.

DESCRIPTION OF THE PREFERRED EMBODIMENT

Figure 1:
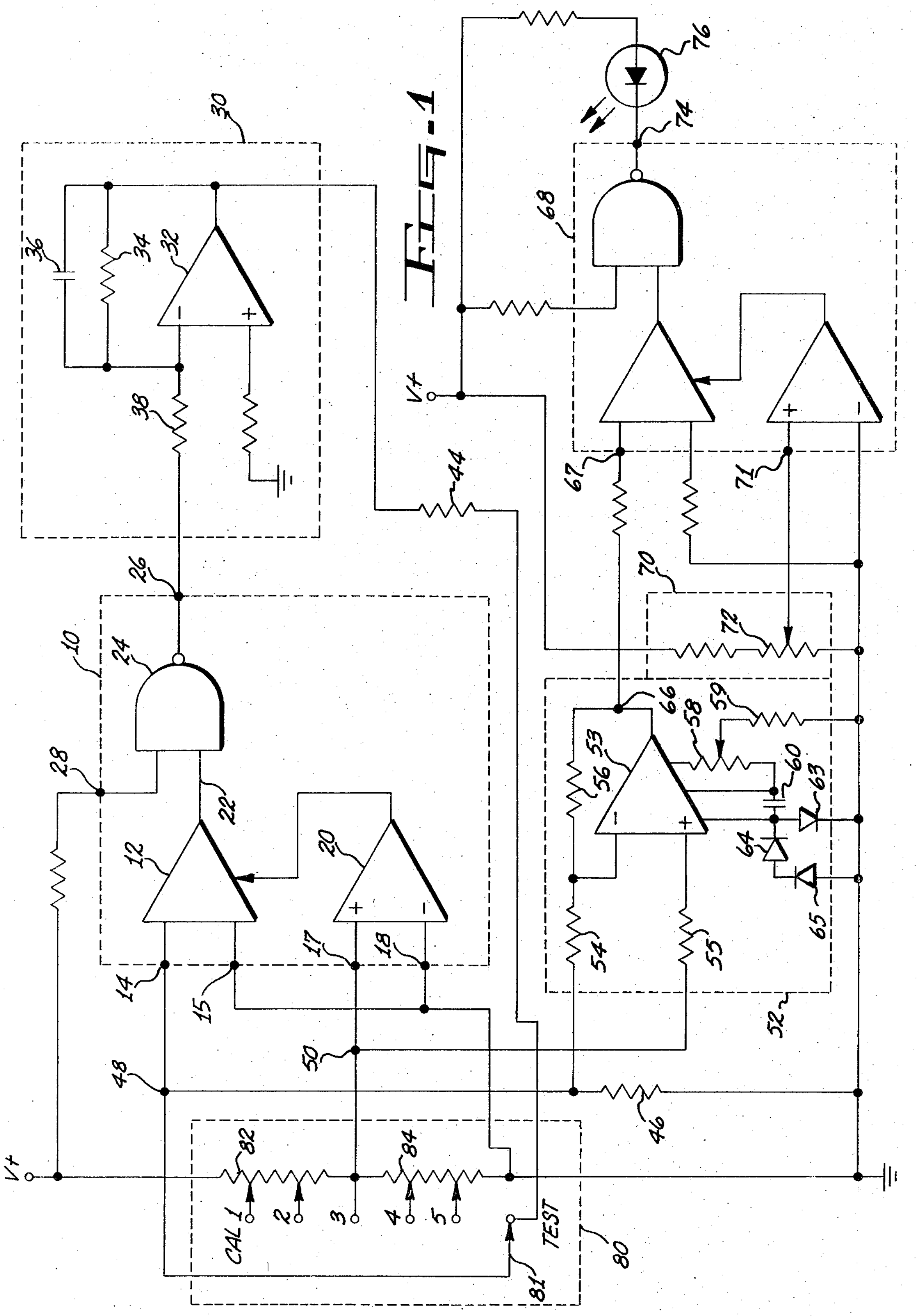
FIG. 1 is a circuit diagram of one embodiment of the present invention.
Figure 2:
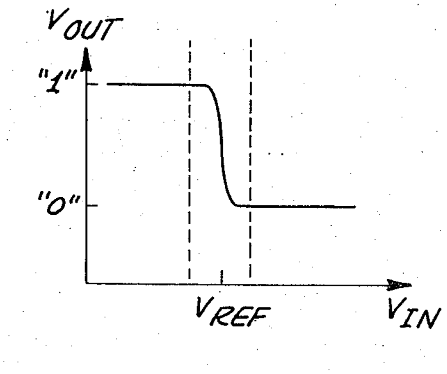
FIG. 2 is an idealized response curve of a typical sense amplifier circuit.

Referring to FIG. 1, a memory sense amplifier 10 is shown in block diagram form comprising an input stage 12 which compares a differential input voltage applied at input terminals 14, 15 with a reference voltage applied at terminals 17, 18. A reference bias voltage is established in a reference amplifier 20 and transferred to the input stage 12. An enabling voltage is produced by the input stage 12 on line 22, if the differential input voltage exceeds the reference bias voltage. In response to the enabling input on line 22 and a strobe or enable signal applied to input terminal 28 a digital output stage 24 produces an appropriate digital output voltage $V_{out}$ at output terminal 26. FIG. 2 shows an idealized representation of the transfer characteristics of the sense amplifier 10 of FIG. 1. FOR $V_{in} < V_{ref}$, the output is high or logical 1; for $V_{in} < V_{ref}$, the output is low or logical 0. For $V_{in} = V_{ref}$, the device is linear. The sense amplifier 10 of FIG. 1 is representative of a prepackaged, commercially available integrated circuit device, as for example, the type SN7520 and SN7522 dual-in-line packages, manufactured by Texas Instruments, Incorporated. These devices are high-speed monolithic integrated sense amplifiers for use in high speed memory systems. In order to test the dynamic operating characteristics of the sense amplifier 10 in the threshold region (represented diagrammatically by dashed lines in FIG. 2) the digital output of the sense amplifier 10 is applied to a low-pass filter or integrator circuit 30 comprising a general purpose operational amplifier 32, feedback resistor 34, and an integrator network comprising capacitor 36 and resistor 38. The details of the operation of the integrator circuit 30 of FIG. 1 are relatively well known in the art, consequently, the details will be omitted the in this description. For a detailed description of operational amplifier circuits reference is made to chapter 4 of a textbook, "Integrated Circuits and Semiconductor Devices: Theory and Application," by Gordon J. Deboo and Clifford N. Burrous, published by the McGraw Hill Book Company, New York, N.Y. The time constant of the integrator circuit 30 is arbitrary within the range of the operating environment of the sense amplifier 10, and may be varied in order to simulate varying operating environments. A relatively low frequency is preferable, however, to preclude any affect on circuit operation due to propagation time of the circuit under test. In the embodiment described herein, the time constant of the integrator circuit 30 is about 0.6 ms; the circuit 10 under test may oscillate at rates as high as 30 Mhz if the high frequency component of the digital output were not removed.

The output of the integrator circuit 30 is attenuated by a voltage divider network comprising resistors 44 and 46 and reapplied to the input stage 12 of the sense amplifier 10 at input terminal 14. The inputs to the sense amplifier 10, $V_{in}$ at junction point 48, and the reference voltage $V_{ref}$ at junction point 50, are applied also to the inputs of a differential amplifier circuit 52, where the algebraic difference between $V_{in}$ and $V_{ref}$ is detected and amplified. The differential amplifier 52 comprises a general purpose operational amplifier 53 with input resistors 54, 55, a feedback resistor 56, a null offset circuit comprising variable resistor 58, fixed resistor 59 and capacitor 60, and output clamp diodes 63, 64 and 65. Both general purpose operational amplifiers 53, 32, of FIG. 1 may be standard integrated circuit components such as the LM301A manufactured by National Semiconductor Corporation. A more detailed description of the operation of the differential amplifier circuit 52 may be found in the aforementioned textbook by Deboo and Burrous.

The amplified difference voltage $V_{dif}$ appearing at junction point 66 is applied to input terminal 67 of a comparator circuit 68, where the difference voltage is compared with a predetermined reference error voltage developed in a reference network 70. The comparator circuit 68 may utilize a standard operational amplifier circuit or, as in the presently described embodiment, a sense amplifier circuit like the circuit 10 being tested. If the difference voltage $V_{dif}$ at input terminal 67 exceeds the predetermined reference error voltage $V_{err}$ applied to input terminal 71, the digital output of the comparator circuit 68 at terminal point 74 is utilized to enable an indicator 76 which may be a light-emitting diode (LED) as illustrated in FIG. 1. The indicator 76, when enabled, signals rejection of the sense amplifier 10 being tested.

Figure 3:
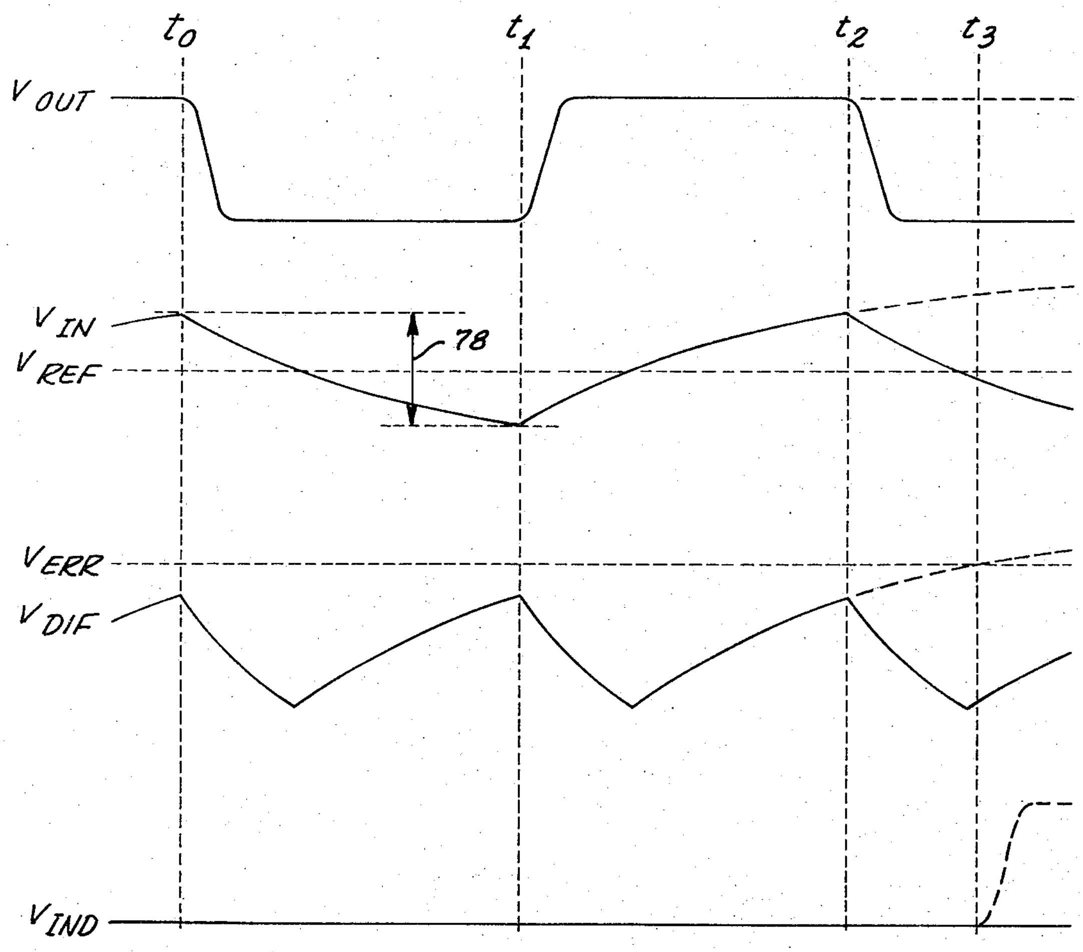
FIG. 3 is a diagram of voltage waveforms of the circuit of FIG. 1.

In order to explain more fully the operation of the tester of FIG. 1, reference is now made to FIG. 1 in conjunction with FIG. 3. FIG. 3 illustrates the voltage waveforms of the circuit of FIG. 1. The input voltage to the sense amplifier 10 under test at the junction point 48 will normally ocillate between limits designated by the arrow 78 in FIG. 3 about an average voltage which is defined as the device 10 threshold voltage. Ideally, the device threshold voltage is equal to the reference bias voltage $V_{ref}$. A typical cycle of operation for a normal device is described with reference to FIGS. 1 and 3: at time $t_0$, $V_{out}$ at junction point 26 is assumed to be high, or a logical 1. $V_{in}$ at junction 48, the integrated and attenuated $V_{out}$ signal, reaches an amplitude sufficiently above the $V_{ref}$ voltage at $t_0$ to cause the output of the differential amplifier 12 to change the digital output at terminal point 26 from 1 to 0 as indicated by the $V_{out}$ waveform, just subsequent to time $t_0$ in FIG. 3. Note, at $t_0$, that the $V_{dif}$ signal, representative of the difference between the $V_{in}$ and the $V_{ref}$, does not exceed the predetermined error reference voltage $V_{err}$. Consequently, the LED 76 (FIG. 1) remains off, indicating that the operating characteristics in the threshold tolerance region of the device under test are acceptable. At time $t_1$, FIG. 3, the $V_{in}$ signal has decreased a sufficient amount below the $V_{ref}$ signal to toggle the output stage 24 (FIG. 1), thereby generating a logical 1 $V_{out}$ signal. Again, at time $t_1$, the $V_{dif}$ signal remains below the $V_{err}$ reference signal indicating acceptable performance of the tested device.

The waveforms for a device 10 under test having unacceptable operating characteristics in the threshold tolerance region are illustrated by dashed lines in FIG. 3. At time $t_2$, the $V_{in}$ waveform continues to increase above the $V_{ref}$ level such that $V_{dif}$ exceeds $V_{err}$ at time $t_3$, and the LED 76 (FIG. 1) is enabled by the $V_{ind}$ signal at terminal point 74.

Referring now to FIG. 1, calibration network 80 comprising a switch 81 and voltage divider resistors 82, 84 having variable output taps CAL 1, 2, 4, 5, is provided for applying incremental voltages above (CAL 1, 2) and below (CAL 4, 5) the predetermined reference voltage $V_{ref}$ (CAL 3) to the input stage 12 of the sense amplifier 10 under test at input terminal 14. To prepare the tester for use, the switch 81 is first set to the CAL 3 position, applying $V_{ref}$ to both the input stage 12 and the reference amplifier 20. The variable resistor 58 is then adjusted to null the output of the differential amplifier 52, measured at junction point 66. Next, an upper limit of acceptable performance is established by applying CAL 1 and CAL 2 potentials, measured at junction point 48, to the input stage 12, and adjusting resistor 72 so the LED 76 actuates when CAL 1 is applied and remains off when CAL 2 is applied. The lower limit of acceptable performance is then established utilizing the CAL 4, 5 potentials applied to input terminal 14. The setting of variable resistor 72 is checked at the lower limit; the upper and lower limits may be "rocked in" in order to accurately establish an acceptable threshold region, illustrated by the arrow 78 in FIG. 3. For example, if the threshold voltage of junction point 50 is 15 mv and an acceptable threshold variation is ±2.95 mv, the tester is adjusted to accept 17.95 mv (CAL 2) and 12.05 mv (CAL 4) and to reject 18.05 mv (CAL 1) and 11.95 mv (CAL 5). The tester thus will accept a device 10 with ±2.95 mv threshold variation and reject one with ±3.05 mv variation.

While the principles of the invention have been made clear in an illustrative embodiment, there will be immediately obvious to those skilled in the art many modifications of structure, arrangement, proportions, the elements, material and components that may be used in the practice of the invention which are particularly adapted for specific environments without departing from those principles. The appended claims are intended to cover and embrace any such modifications within the limits only of the true spirit and scope of the invention.

What is claimed is:

1. A method for dynamically testing the threshold characteristics of a sense amplifier circuit, comprising the steps of:
- applying a predetermined reference voltage to the sense amplifier being tested;
- integrating a complement digital output signal of the sense amplifier being tested;
- applying the integrated output signal to the sense amplifier circuit being tested as an input voltage;
- detecting the difference between the predetermined reference voltage and the input voltage;
- comparing the detected difference voltage with a predetermined error voltage;
- rejecting the sense amplifier circuit being tested when the difference voltage exceeds the predetermined error voltage.

2. A method of dynamically testing the threshold characteristics of a sense amplifier circuit of the type having an input stage comparing an input voltage with a reference voltage, and an output stage responsive to the difference between the input and reference voltages to produce a digital output signal representative of the polarity of the difference, said method comprising the steps of:
- applying a predetermined reference voltage to the sense amplifier circuit being tested;
- integrating a complement digital output signal of the sense amplifier being tested to remove the high frequency component thereof;
- attenuating the integrated output signal such that the average voltage about which the attenuated signal varies approaches the reference voltage;
- applying the integrated and attenuated output signal to the input stage of the sense amplifier circuit being tested as the input voltage;
- detecting the difference between the reference voltage and the input voltage;
- comparing the detected difference voltage with a predetermined error voltage; and
- rejecting the sense amplifier circuit being tested when the difference voltage exceeds the predetermined error voltage.

3. A method for dynamically testing the threshold characteristics of a sense amplifier circuit of the type having an input stage comparing an input voltage with a reference voltage, and an output stage responsive to the difference between the input and reference voltages to produce a digital output signal representative of the polarity of the difference, said method comprising the steps of:
- applying a predetermined reference voltage to a reference amplifier of the input stage of the sense amplifier circuit being tested;
- converting the complement digital output signal of the sense amplifier being tested to the integrated voltage analog of the digital output signal;
- attenuating the converted output signal such that the average voltage about which the attenuated signal varies approaches the predetermined reference voltage;
- feeding back the converted and attenuated output signal to the input stage of the sense amplifier as the input voltage;
- detecting the difference between the predetermined reference voltage and the input voltage;
- amplifying the detected difference voltage;
- comparing the amplified difference voltage with a predetermined reference error voltage;
- rejecting the sense amplifier being tested when the amplified difference voltage exceeds the predetermined reference error voltage.

4. A method for dynamically testing the threshold characteristics of an integrated circuit sense amplifier module of the type having an input stage comparing a differential input voltage with a reference voltage, and an output stage responsive to the difference between the input and reference voltages to produce a digital output signal representative of the polarity of the difference, said method comprising the steps of:
- applying a predetermined reference voltage to reference amplifier of the input stage of the sense amplifier module being tested;
- complementing the digital output signal;
- integrating the complemented digital output signal to remove the high-frequency component therefrom;
- attenuating the integrated output signal such that the average voltage about which the attenuated signal varies approaches the predetermined reference voltage;
- applying the attenuated signal to the input stage of the sense amplifier module being tested as the differential input voltage;
- detecting the difference between the predetermined reference voltage and the differential input voltage;
- amplifying the detected difference voltage;
- comparing the amplified difference voltage with a predetermined error voltage;
- rejecting the sense amplifier module being tested when the amplified difference voltage exceeds the predetermined error voltage.

5. Apparatus for dynamically testing the threshold characteristics of an integrated circuit memory sense amplifier module of the type having an input stage comparing a differential input voltage with a reference voltage, and an output stage responsive to the difference between the input and reference voltages to produce a digital output signal representative of the polarity of the difference, said apparatus comprising:
- an integrator circuit having an input terminal connected to the output stage of the sense amplifier module being tested;
- an attenuator comprising first and second voltage divider resistors connected in series between an output terminal of the integrator circuit and ground, the junction point of said first and second resistors connected to the input stage of the sense amplifier module under test;

a reference voltage source connected to a reference voltage amplifier of the input stage of the sense amplifier module under test;

a difference amplifier circuit having a difference voltage output terminal and first and second input terminals, the junction point of said first and second resistors connected to the first input terminal, the reference voltage source connected to the second input terminal;

an error reference voltage source;

a comparator circuit having an error output terminal and signal and reference input terminals, the reference input terminal connected to the error reference voltage source, the signal input terminal connected to the difference voltage output terminal of the difference amplifier; and an indicator connected to the error output terminal of the comparator circuit and actuated in response to an error signal produced by the comparator circuit when the difference voltage exceeds the error reference voltage.

* * * * *